(No Model.)
W. McTYRE.
COFFEE OR TEA POT.
No. 364,597. Patented June 7, 1887.
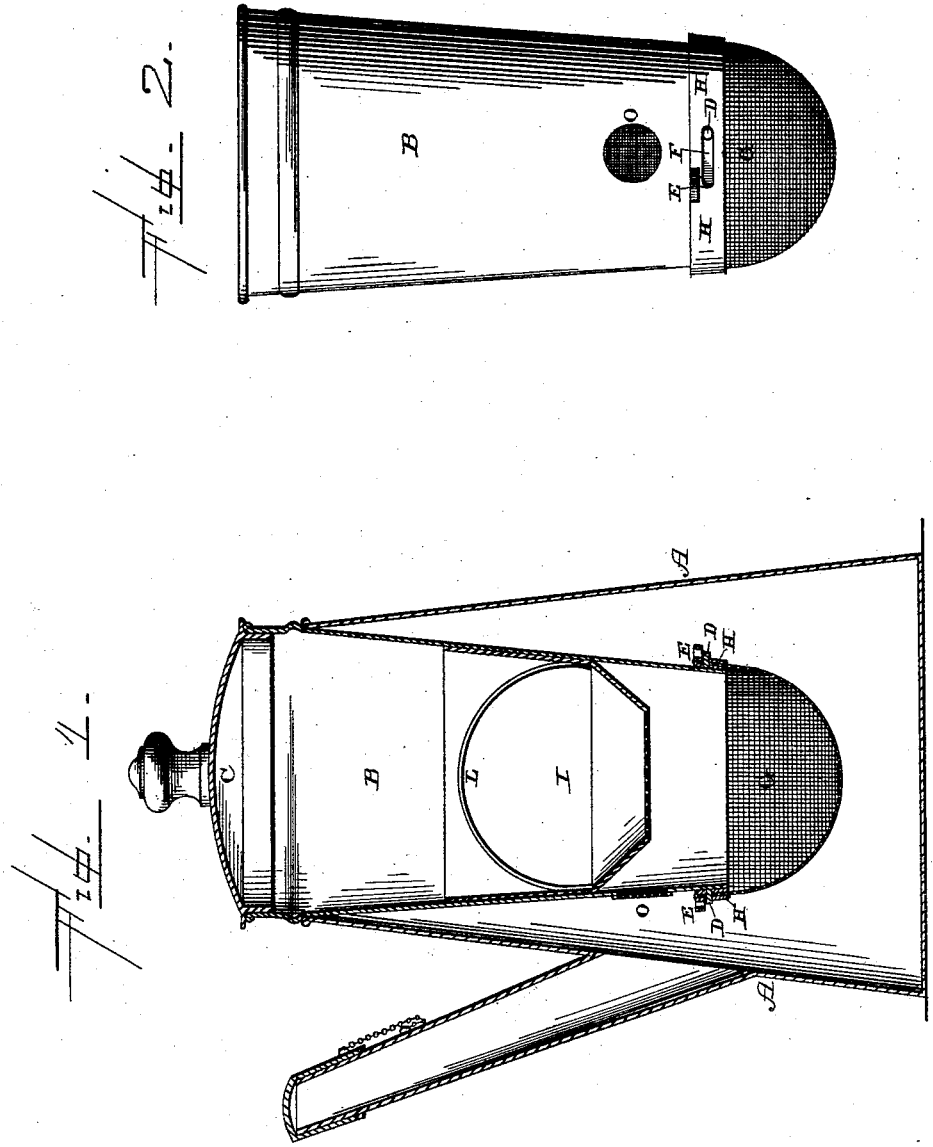

UNITED STATES PATENT OFFICE.

WILLIAM McTYRE, OF MADISON, INDIANA.

COFFEE OR TEA POT.

SPECIFICATION forming part of Letters Patent No. 364,597, dated June 7, 1887.

Application filed March 15, 1887. Serial No. 230,979. (No model.)

*To all whom it may concern:*

Be it known that I, WILLIAM MCTYRE, of Madison, in the county of Jefferson and State of Indiana, have invented certain new and useful Improvements in Coffee and Tea Pots; and I do hereby declare the following to be a full, clear, and exact description of the invention, such as will enable others skilled in the art to which it pertains to make and use it, reference being had to the accompanying drawings, which form part of this specification.

My invention is an improvement in tea and coffee pots; and it consists in the arrangement and combination of parts, which will be more fully described hereinafter, and pointed out in the claim.

The object of my invention is to provide a cup-shaped receiver, which is made of fine wire gauze to receive the grounds of the coffee, and to make this cup detachable, so that it can be removed and cleaned at any time; to place within the cylinder a conical-shaped strainer for the purpose of both straining the water which is poured upon the ground coffee or tea which is placed within the cup and to prevent the tea or coffee from rising in the cylinder when the water is poured in, and to place ventilating-openings in the side of the cylinder, just above the top of the cup.

Figure 1 is a vertical section taken through a tea or coffee pot embodying my invention. Fig. 2 is a side elevation of the cylinder and cup.

A represents the tea or coffee pot, which is of the ordinary construction. Placed in the top of this pot is the cylinder B, which has its upper end extended a suitable distance above the top of the pot, so as to receive the cover C. Projecting from the lower end of this cylinder are the two studs or projections D, which pass down through the loops E and into the slots F, formed in the upper edge of the cup G. This cup is made of wire-gauze, which is secured to the metal band H at its top edge, and through which band the slots are made. This cup is intended to receive the ground coffee or tea and to hold it while the hot water is percolating through it. By means of the studs, the loops, and the slots this cup can be quickly attached to or detached from the cylinder whenever so desired. After the studs have been passed through the loops, it is only necessary to turn the cup partially around, when the studs pass into the slots, and thus support the cup firmly in position.

In order to strain the water which is being poured upon the ground coffee or tea-leaves held in the cup, and to prevent the grounds or the leaves from rising up into the cylinder when the water is poured upon them, the strainer I is placed in the cylinder. This strainer has conical-shaped walls, which fit snugly inside of the cylinder, and thus prevent any upward movement of the coffee or leaves beyond a certain point, thereby causing the ground coffee or tea-leaves to be thoroughly acted upon by the water as it percolates through them. Inside of this strainer is placed a handle, L, by means of which the strainer can be placed in and removed from the cylinder at will.

In order to allow a perfect ventilation in the lower part of the cylinder, one or more ventilators, O, are placed in the side or sides of the lower portion of the cylinder, as shown. These ventilators are formed of fine wire-gauze, which cover the openings made in the side of the cylinder, and which, while they prevent the escape of any ground coffee or tea-leaves, allow the air to circulate freely around in all directions. In order that the strainer may not interfere with these ventilators, the lower end of the strainer is made conical, as shown, so as to leave ample space around the ventilators.

The cylinder and cup extend nearly down to the bottom of the coffee-pot, so that the lower portion of the cup containing the coffee or tea will be submerged in the extract which has been formed by pouring boiling water in the cylinder and allowing it to flow out through the tea or coffee.

Having thus described my invention, I claim—

The combination of the pot A, the cylinder

B, which has its upper end to project above the pot, so as to receive the cover C, the strainer I, provided with a handle, L, and having its lower edges inclined inward, so as to form a space around its lower end, and the ventilator O, located below the lower edge of the strainer and above the cup G, and the cup G, substantially as shown and described.

In testimony whereof I affix my signature in presence of two witnesses.

WILLIAM McTYRE.

Witnesses:
ALFRED McTYRE,
JOHN MARSH.